Figure 1:
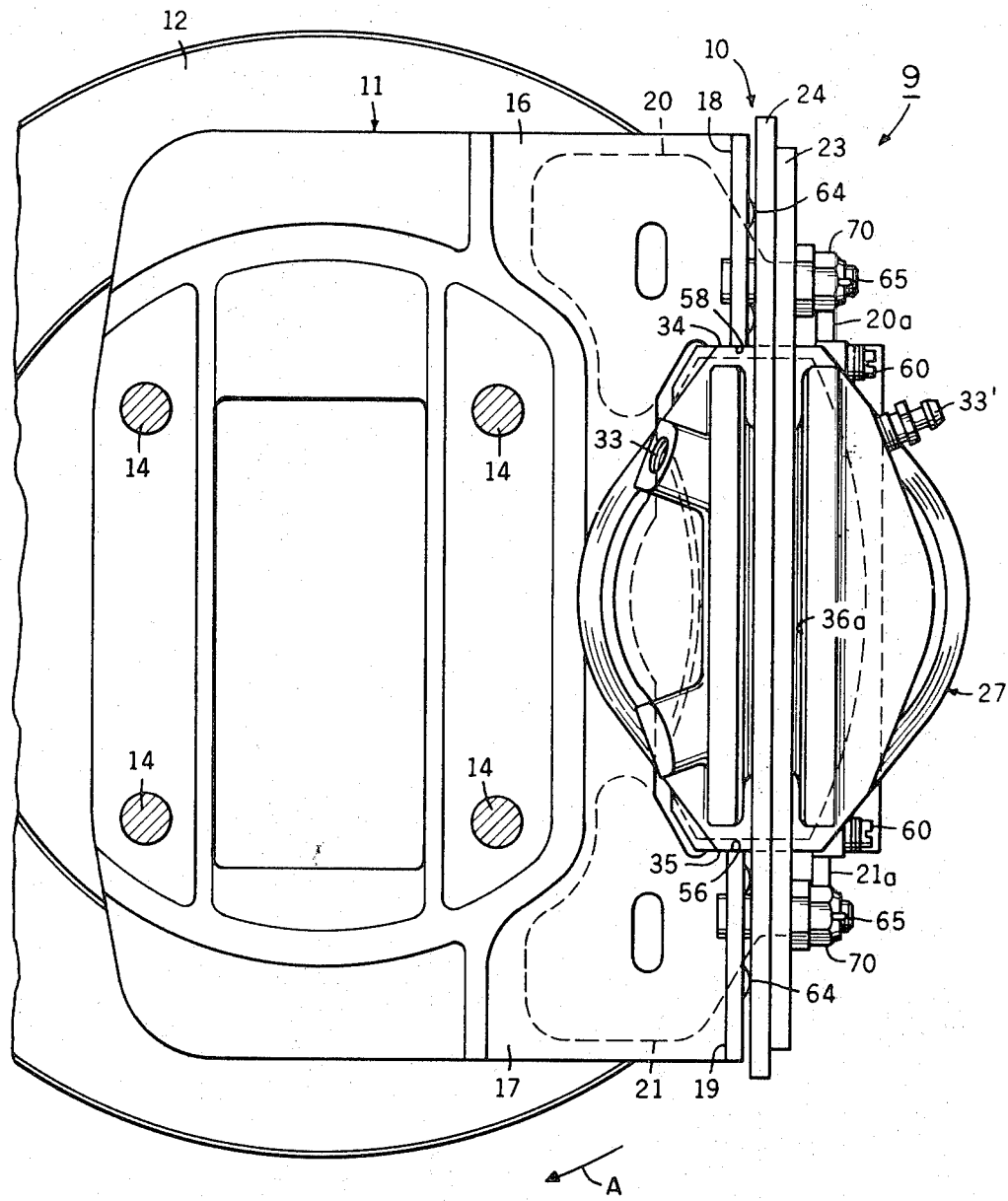

United States Patent

[11] 3,532,192

| [72] | Inventor | Edward J. Falk<br>6318 Gardenville Ave., St. Louis, Missouri 63116 |
|---|---|---|
| [21] | Appl. No. | 854,661 |
| [22] | Filed | Sept. 2, 1969 |
| [45] | Patented | Oct. 6, 1970<br>Continuation of Ser. No. 711,579, March 8, 1968, now Patent No. 3,507,365. |

[54] CLOSED LOOP TYPE DISC BRAKE AND SUPPORT MEANS THEREFOR
12 Claims, 6 Drawing Figs.

[52] U.S. Cl. .................................................. 188/73.4
[51] Int. Cl. .............................................. F16d 55/224
[50] Field of Search ........................................... 188/73, 73(CL)

[56] References Cited
UNITED STATES PATENTS

| 3,414,090 | 12/1968 | Hambling | 188/73(CL)UX |
| 3,422,935 | 1/1969 | House | 188/73 |
| 3,464,523 | 9/1969 | Machek | 188/73(CL)UX |

*Primary Examiner*—George E. A. Halvosa
*Attorney*—Joseph E. Pepin

ABSTRACT: A disc brake having a rotatable disc, a non-rotatable support, a closed loop member, a pair of friction members on opposite sides of the disc, a fluid pressure actuator connected to the closed loop member and slidably engaged between extended portions of the support for effecting movement of one of the friction members in one direction into engagement with the disc and the loop member in the opposite direction to move the other friction member into engagement with the disc. The torque is transferred from one of the friction members directly to the support, and the torque from the other friction member is transmitted through the closed loop member and actuating means to the support.

INVENTOR
EDWARD J. FALK

Patented Oct. 6, 1970

3,532,192

INVENTOR
EDWARD J. FALK

INVENTOR
EDWARD J. FALK 3,532,192

CLOSED LOOP TYPE DISC BRAKE AND SUPPORT MEANS THEREFOR

This application is a continuation-in-part of co-pending application Ser. No. 711,579 which was filed on March 8, 1968, now U.S. Pat. No. 3,507,365 for "Disc Brake".

This invention relates to friction devices and more particularly to disc brakes.

In the past, certain disc brakes of the type having a caliper frame movable to apply brake shoes against opposed sides of the brake disc had certain disadvantageous or undesirable features. These undesirable features included excessive taper wear and shortened brake shoe life, "rattle" noise, large space requirements, and relatively high cost of manufacture. For example, in some past disc brake constructions, the movable frame had an undesirable amount of freedom of movement in directions other than the desired axial or brake applying direction under dynamic conditions, and this resulted in excessive taper wear of one or both of the brake shoes and shortened brake shoe life, and in some cases, an undesirable amount of noise. In such past disc brake constructions of the type having a closed loop frame in which a brake actuator or wheel cylinder is utilized to move the inboard brake shoe in one direction against one side of the disc and to move the frame in the opposite direction to, in turn, move the outboard brake shoe against the opposite side of the disc, moments were produced due to the transfer of torque from the outboard shoe to the frame that tended to rotate the frame in its own plane, and which resulted in excessive taper wear on the outboard shoe due to excessive freedom of angular movement or rotation of the frame as a result of manufacturing tolerances and stresses on parts of the brake.

An object of the present invention is to provide a disc brake which overcomes the aforementioned undesirable or disadvantageous features, and this, as well as other objects and advantageous features of the present invention, will become apparent in the specification which follows.

Briefly, in accordance with one aspect of the present invention, a friction device is provided which includes support means adapted for connection adjacent to rotatable disc means and having a pair of spaced anchor means, a movable member for anchoring engagement with the anchor means and having interconnected portions disposed respectively on opposed sides of the disc, a friction member between one portion and one disc side, another friction member between the other portion and the other disc side, said other portion including actuating means for moving the other friction member in one direction into frictional engagement with the disc and the movable member in the opposite direction to move the first named friction member into frictional engagement with the disc, the torque of the frictional engagement of the friction members being transmitted to one of the anchor means when the disc is rotating in one direction.

Figure 2:
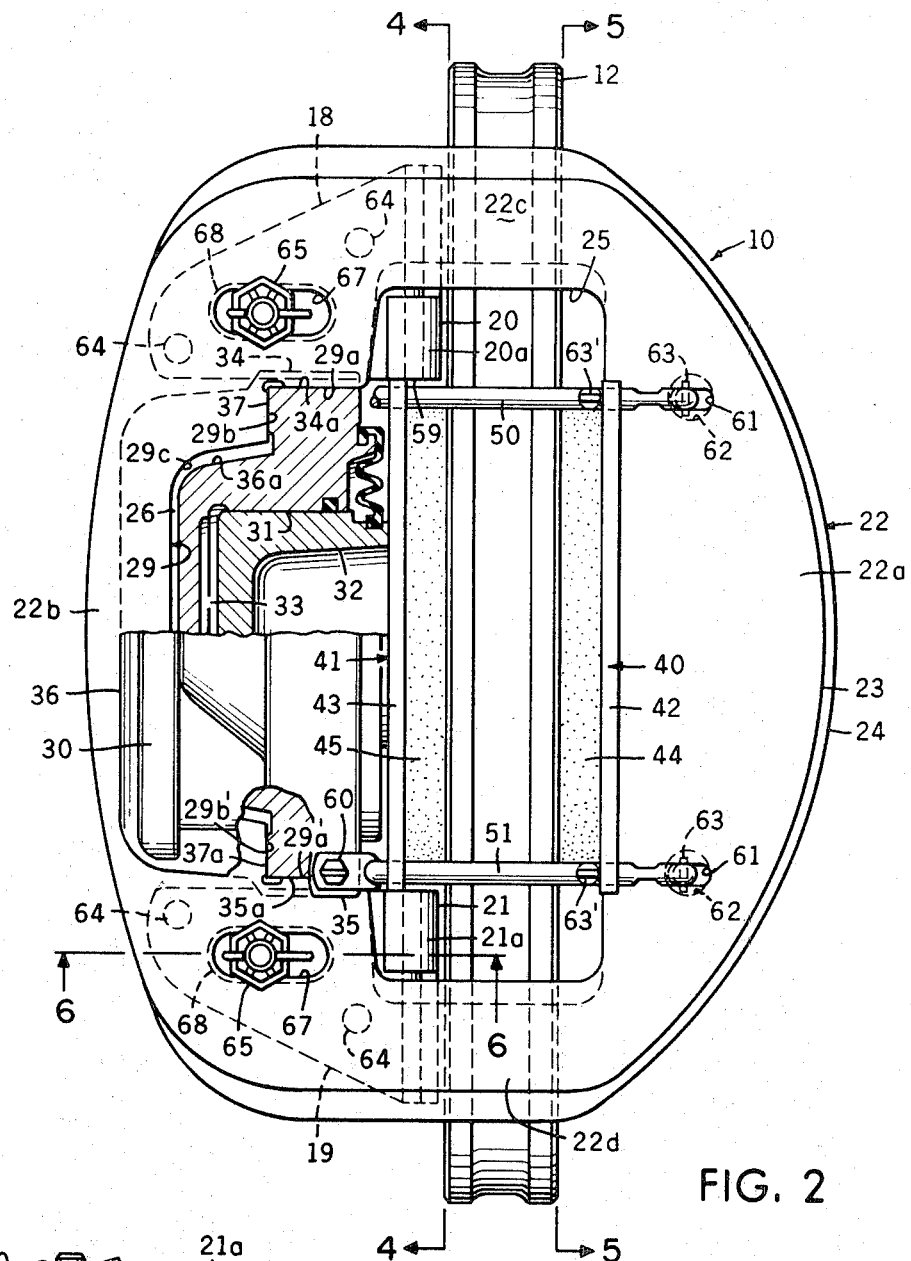
Figure 6:
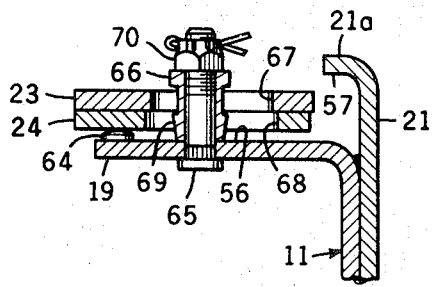
Figure 3:
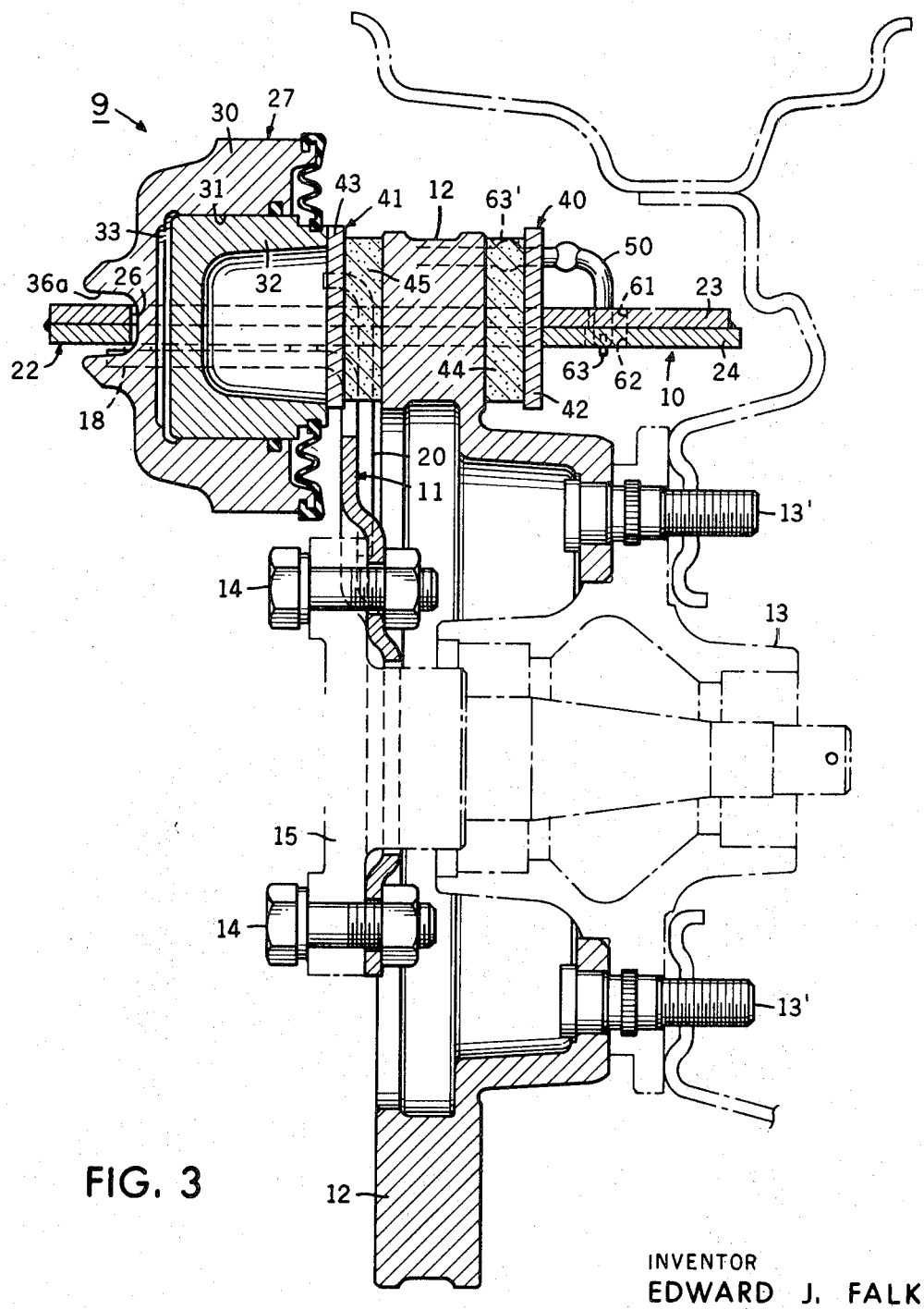
Figures 4, 5:
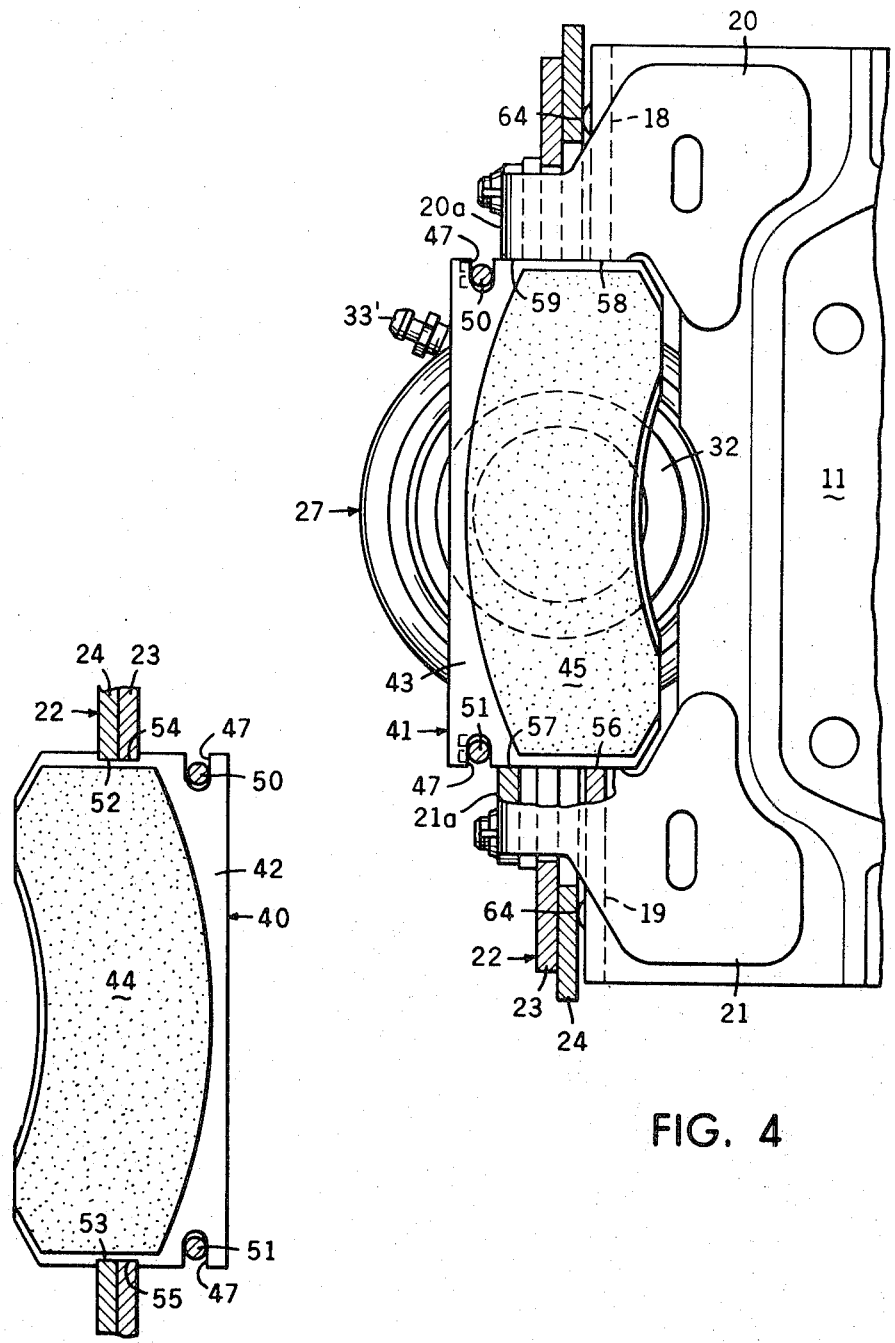

In the drawings which illustrate embodiments of the present invention and wherein like numerals refer to like parts wherever they occur, FIG. 1 is an elevational view of a disc brake according to the present invention, FIG. 2 is a plan view, partly in section, of the brake of FIG. 1, FIG. 3 is a sectional view taken along the line 3—3 of FIG. 2, FIG. 4 is a sectional view taken along the line 4—4 of FIG. 2, FIG. 5 is a sectional view taken along the line 5—5 of FIG. 2, and FIG. 6 is a sectional view taken along line 6—6 of FIG. 2.

Referring now to the drawings and particularly to FIGS. 1—4, there is illustrated a disc brake 9 which includes a disc brake unit, indicated generally at 10, mounted on a non-rotatable support member 11 which extends adjacent one side of a rotor or disc 12 having opposed annular braking surfaces and connected for rotation with a hub 13 (FIG. 3) of a vehicle wheel by a plurality of bolts 13'.

Support member 11 is in the form of a sheet-metal stamping secured by bolts 14 to a stationary part shown as an axle spindle or flange 15. Support member 11 extends parallel to the plane of disc 12 and is provided with a pair of circumferentially spaced arms 16 and 17 (FIG. 1) having flanges 18 and 19, each flange being in a plane normal to the plane of disc 12. Flanges 18 and 19 provide a supporting table for the brake unit 10, as will be explained in greater detail hereinafter. The arms 16 and 17 are provided with a pair of strengthening and torque-taking members 20 and 21, respectively, that are secured, such as by welding, to the upper portions of the arms, members 20 and 21 extending radially upwardly beyond the plane of flanges 18 and 19 and have upper end portions 20a and 21a, respectively, which extend in a plane parallel to the plane of flanges 18 and 19. The flange 18 and member 20 together and the flange 19 and member 21 together define spaced anchors on support 11 for the brake unit 10.

The brake unit 10 includes a movable or sliding beam or frame 22, shown as a closed loop member, extending chordwise of disc 12. The frame 22 has a pressure portion, indicated at 22a, on one side of disc 12 and a reaction portion, indicated at 22b, on the opposite side of disc 12, the pressure and reaction portions 22a and 22b being connected together by end portions 22c and 22d which extend across the outer periphery of disc 12. Frame 22 includes a pair of sheet-metal plates or stampings 23 and 24 secured together, such as by welding, and has formed therein an opening 25 through which a peripheral or chordal portion of disc 12 rotates, and an opening 26 in the reaction portion 22b intersecting opening 25 and in which a brake actuating member 27, shown as a fluid pressure responsive motor or hydraulic wheel cylinder, is secured.

Opening 26 has a peripheral edge 29 (FIG. 2) including a pair of opposed axially extending edge portions 29a and 29a' which intersect the edge of opening 25, edge portions 29b and 29b' connecting with and extending normal to edge portions 29a and 29a', and a curving or cup-shaped bottom edge portion 29c which extends between portions 29b and 29b'.

The wheel cylinder 27 includes a housing 30 having a bore 31 and an actuating piston 32 slidably and sealably engaging the bore and defining therewith an expansible chamber 33 which is provided with a pressure fluid inlet at 33' and a bleeder opening at 33". The housing 30 has a pair of opposed, axially extending outer side walls 34 and 35 and a rear wall 36 closing one end of bore 31. The walls 34, 35 and 36 are provided with grooves 34a, 35a and 36a, respectively, which receive portions of the peripheral edge 29 of frame 22 to obviate radial movement of the cylinder 27. The rear wall groove 36a extends radially inwardly with respect to the cylinder bore 31 from the grooves 34a and 35a to provide abutments 37 and 37a adjacent the opposed sides of the cylinder housing 30. During assembly, the housing 30 is pressed axially into the opening 26, the opposed peripheral edge portions 29a, 29a' of frame member 22 being a slight press-fit with or frictionally engaging side wall grooves 34a and 35a, respectively. The cylinder 27 is moved axially into opening 26 until the peripheral edge portions 29b and 29b', respectively, engage the abutments 37 and 37a. The housing 30 and frame 22, in some cases, may be integrally formed, if desired.

A pair of like friction members or brake shoes 40, 41 are mounted in facing relation on opposite sides of disc 12 within the opening 25. Brake shoes 40 and 41 include backing plates 42 and 43, respectively, and pads of friction material 44 and 45 respectively secured to the backing plates 42 and 43, such as by rivets or conventional bonding means. As seen also in FIGS. 4 and 5, each of the backing plates 42 and 43 is provided with a pair of slots or grooves 47 formed in the opposed ends thereof which receive mounting or hold-down rods 50 and 51, as will be more fully described hereinafter.

Brake shoe 40 is mounted on pressure portion 22a of frame 22 for movement therewith. The pressure portion 22a has a shallow cut-out or opening with opposed walls 52 and 53 (FIG. 5) which are respectively engageable with the bottom walls of notches 54 and 55 provided in the opposed ends of backing plate 42 to provide torque transmitting connections between the backing plate 42 and frame 22. The other brake shoe 41 is disposed axially between the piston 32 and the disc 12 and circumferentially between arms 16 and 17 of the support member 11, the radially outer portions of the arms providing sliding anchoring or torque-taking connections between the backing plate 43 and the support member 11. As seen in FIGS. 2 and 4, one end of backing plate 43 slidably anchors on portions of arm 17 including inner side 56 of flange 19 and inner side 57 of arm extension 21. Similarly, the other end of backing plate 43 slidably anchors on portions of arm 16 including inner side 58 of flange 18 and inner side 59 of the arm extension 20, as is also apparent in FIG. 3. Thus, the shoe 41 is directly slidably engageable with support member 11 below and above the frame 22.

Each of the mounting rods 50 and 51 is secured to the housing 30 adjacent one end thereof by a screw 60 (FIG. 1) and extends axially across the periphery of disc 12 and through slots 47 of the backing plates 42 and 43. The right ends of rods 50 and 51 curve downwardly, as seen in FIGS. 2 and 3, and extend through elongated slots 61 provided in the plate 23 in the pressure portion 22a of the frame 22. Enlarged holes 62 are provided in the plate 24 respectively in registration with the slots 61. Extension abutments 63 (FIG. 2) are provided on the lower ends of rods 50 and 51 that extend cross-wise the narrow dimensions of slots 61 and engage the lower side of plate 23 to prevent movement of these ends outwardly of the frame 22 when in assembled relation, as shown in the drawings. Another pair of extension abutments 63' are shown on the rods 50 and 51 on the disc side of backing plate 42 to insure that backing plate 40 remains between the torque-transmitting walls 52 and 53 of frame 22. The abutments 63 and 63' are shown as extrusions on the rods 50 and 51. With this arrangement, the brake shoes 40 and 41 are readily inserted and removed from the brake unit 10. For example, by removing the screws 60 from their mounting holes in the housing 30 and moving the left ends of rods 50 and 51 apart, as viewed in FIG. 2, the rods leave the slots 47 of backing plates 42 and 43 and free the brake shoes 40 and 41 for removal. When desired, the rods 50 and 51 may be removed from frame 22 by moving them apart until the abutments 63 extend lengthwise of the longer dimension of slots 61 so that the abutments 63 will pass through slots 61. With the rods 50 and 51 removed from the backing plate slots 47, shoe 40 can be moved slightly toward disc 12 until the slots 54 and 55 (FIG. 5) are free of the frame 22, and then radially outwardly from the brake unit 10. If necessary, the frame 22 can be moved axially rightwardly to provide sufficient space for the removal of shoe 40. The shoe 41 can simply be lifted radially outwardly of the unit 10. With the rods 50 and 51 apart, new brake shoes can be inserted and then the rods 50 and 51 returned to the positions shown in FIG. 2 to hold the new shoes in place.

The brake unit 10 is mounted for axial sliding movement on the flanges 18 and 19 of support member 11. Each of the flanges 18 and 19 is shown provided with a pair of rounded bearing surfaces shown as buttons 64 on which frame 22 is slidable. The buttons 64 are shown as extrusions of the flanges. A pair of mounting studs 65 are respectively press-fitted in openings in the flanges 18 and 19 and extend through spacers 66 that are disposed in registering openings or slots 67 and 68, respectively, in the frame plates 23 and 24 on opposite sides of cylinder 27. The slots 67 and 68 are relatively long in the axial direction, opening 68 being slightly larger than opening 67. As seen in FIG. 6, the spacer 66 is provided with an enlargement 69 which, during assembly, is pressed through opening 67 in the plate 23 and into larger opening 68 in plate 24, whereby the spacer, after insertion, cannot fall out of opening 67. The distance from the bottom of the spacer to the head thereof is greater than the thickness of frame 22 plus the height of the buttons 64 so that when the nuts 70 are tightened down against the heads of the spacer 66, the spacers 66 insure freedom of movement of frame 22 relative to the support member 11.

Referring especially to FIG. 1, the opposed sides 34 and 35 of the housing 30 slidably engage facing sides 56 and 58, respectively, of the flanges 18 and 19, the flanges guiding the brake unit 10 for axial movement. The sides 56 and 58 of flanges 18 and 19 provide anchors or torque-taking connections for the frame 22.

In operation, assuming the disc 12 to be rotating in the forward direction, as indicated by the arrow in FIG. 2, when fluid pressure is supplied to chamber 33 through inlet 33', for example, from a vehicle hydraulic master cylinder (not shown), piston 32 moves rightwardly, as viewed in FIG. 2, to move brake shoe 41 into frictional engagement with one side of disc 12. Thereafter, pressure reaction, i.e., fluid pressure in chamber 33 acting on the cylinder housing 30 after shoe 41 engages disc 12, moves the housing 30 leftwardly applying axial forces on the frame 22 by the engagement between housing abutments 37 and 37a and frame edge portions 29b, 29b' to slide the housing 30 and frame 22 leftwardly whereby the pressure portion 22a moves the brake shoe 40 into frictional engagement with the opposite side of the disc 12. The torque exerted on shoe 41 by disc 12 is taken directly by arm 17 of the support member 11 due to the engagement between backing plate 43 and the flange 19 and extension 21. Torque exerted on shoe 40 by the disc 12 is transmitted to the frame 22 by the engagement between backing plate 42 and the wall 53 (FIG. 5) of the frame 22, and to the upper side wall of groove 34a of housing 30 (FIG. 2) by the engagement thereof with edge portion 29a of the frame, and then through the cylinder housing 30 to the flange 19 of arm 17 of the support member 11 due to the engagement between housing side wall 35 and side 56 of flange 19.

When the disc 12 is rotating in the reverse direction opposite the arrow in FIG. 2 and the brake is actuated, torque exerted on shoe 41 is transmitted directly to flange 18 and extension 20 of arm 16 of the support 11, while torque from shoe 40 is transmitted through the frame 22 to the side wall groove 35a of the housing 30 and thence through the housing to the flange 18 of arm 16 by the engagement between housing side wall 34 and side 58 of flange 18.

The mounting studs 65 and hold-down rods 50, 51 do not take the braking torque in either direction of disc rotation.

It will be apparent that the opposed sides 34 and 35 of the housing 30 and the sides 56 and 58 (FIG. 1) of the flanges 18 and 19 which are slidably engaged by the housing sides 34 and 35 to provide a relatively long guide for the housing 30 and frame 22 of unit 10. The axial length of the surfaces of housing sides 34 and 35 that are in engagement with flange sides 56 and 58 is substantially greater than the thickness of the support 11 and frame 22. Because these engaging guide surfaces between the housing 30 and flanges 18 and 19 of support 11 are relatively long, the amount of freedom of angular movement or rotation of frame 22 in its own plane as a result of manufacturing tolerances and stresses on parts is very small.

Because there is very little or substantially no freedom of rotation of unit 10 including frame 22 relative to support 11, moments produced by the transfer of torque from shoe 40 to the frame 22 tending to angularly move or rotate frame 22 are opposed by support 11 instead of pad 44 to thereby reduce or substantially minimize angular or taper wear of the wear face thereof. Thus, the friction pads 44 and 45 will wear relatively evenly over the wear life thereof.

Also, the relatively long sliding engagement between the housing walls 34 and 35 and flange sides 56 and 58 provide relatively large torque-transferring surfaces for good distribution of the torque transferred from the housing 30 to a flange during braking operations.

From the foregoing, it is now apparent that a novel disc brake meeting the objects and advantageous features set forth hereinabove, as well as other objects and advantages, is provided and that changes as to the precise configurations, shapes and details of the construction set forth in the disclosure by way of illustration may be made by those skilled in the art without departing from the spirit of the invention.

I claim:

1. A friction device for a rotatable disc which comprises:

a. a fixed support mounted adjacent to one side of the disc;

b. a first pair of spaced anchor members on said support adjacent said one side of the disc;

c. a first friction element slidably mounted between said pair of spaced anchor members adjacent said one side of the disc for frictional engagement therewith;

d. spaced portions of said friction element being in position to bear against said spaced anchor members within the periphery of the disc to provide a torque transmitting connection between said friction element and spaced anchor members;

e. a closed loop member slidably mounted on said support to surround a chordal portion of said disc and project outwardly away from said disc;

f. an actuating member, which is a separate member from the said support and loop member, being slidably mounted between said pair of spaced anchor members with a first pair of spaced portions of said actuating member in position to bear in a sliding engagement against each of said anchor members within the periphery of the disc;

g. said actuating member projecting up into the opening in said loop member with a second pair of spaced portions of said actuating member positioned to bear against spaced portions of said loop member to provide a torque transmitting connection between said loop member and said spaced anchor members;

h. a second friction element mounted adjacent the second side of the disc in said loop member to move therewith into frictional engagement with said second side of the disc;

i. spaced portions of said second friction element being positioned to bear against other spaced portions of said loop member to provide a torque transmitting connection therewith;

j. said actuating member being in position to apply a force between said first friction element and loop member to move said first friction element into frictional engagement with said one side of the disc and to move said loop member and second friction element in the opposite direction into frictional engagement with the second side of the disc;

k. the torque of the frictional engagement of said first friction element being taken directly by one of said first pair of spaced anchor members independently of the torque of said second friction element and the torque of said second friction element being taken by said pair of spaced anchor members through the torque transmitting connections between said anchor members, loop member and second friction element; and l. the angular rotational torque of said loop member in its own plane also being taken by the spaced portions of said actuating member which bear against the said pair of spaced anchor members.

2. A friction device according to claim 1, wherein said actuating member comprises a housing connected with said loop member for concerted movement, said housing being embraced by said second pair of spaced anchor members in direct torque transmitting engagement therewith, a piston drivingly engaged with said first named friction element and movable in said housing to define therewith an expansible fluid pressure chamber, said piston and housing being movable in the one and opposite directions to effect the frictional engagement of said first and second friction elements with opposite sides of the disc upon the fluid pressure expansion of said chamber to energize said friction device.

3. A friction device according to claim 1, wherein said pair of spaced anchor members include a pair of spaced flanges on said support member extending in a plane substantially normal to said one disc side with sides in opposed facing relation to define anchor abutments, a pair of opposed anchoring surfaces on said actuating member slidably engaged with the anchor abutments of said pair of spaced anchor members, the torque of said second friction element being transmitted through said loop member and actuating member to urge one of said anchor surfaces into direct engagement with one anchor abutment, and a pair of opposed anchoring ends on said first friction element slidably engaged with said anchor abutments of said pair of spaced anchor members, the torque of said first friction element being transmitted through one of said anchoring ends directly on one of said anchor abutments independently of the torque of said other friction element.

4. A friction device according to claim 1, wherein said actuating member comprises a housing drivingly engaged with said loop member, and wherein said spaced portions on said housing positioned to bear against said loop member comprise opposed groove means in said housing, said loop member being received in said groove means to transmit the torque of said second friction element from said loop member to said housing, a piston drivingly engaged with said first friction element and movable in said housing to define therewith an expansible fluid pressure chamber, said piston and housing being movable to drive said first friction element and loop member in the one and opposite directions and effect the frictional engagement of said first and second friction elements with said opposite sides of the disc upon the fluid pressure expansion of said chamber, and wherein said spaced portions on said housing positioned to bear against said pair of spaced anchor members comprise a pair of opposed anchor surfaces on said housing in sliding anchoring engagement with said pair of spaced anchor members, one of said anchor surfaces being urged toward anchoring engagement with one of said anchor means to transmit the torque of said second friction element from said loop member directly thereon.

5. A friction device according to claim 4, comprising an opening in said loop member through which said disc extends, another opening in said loop member connecting with said first named opening adjacent to said one disc side including opposed side walls interconnected with a base wall, opposed groove means in said housing respectively receiving said opposed side walls to effect concerted movement of said housing with said member and to transmit the torque of said second friction element from said loop member to said housing, spaced abutments on said housing respectively adjacent to said groove means in driving engagement with said base wall for moving said loop member in the opposite direction and frictionally engage said second friction element with the side of the disc, said pair of anchor members including a pair of flange means extending in a plane substantially normal to said one disc side, and a pair of anchor abutments on said flange means in opposed facing relation, said opposed anchoring surfaces on said housing being slidably engaged with said anchor abutments wherein the torque of said second friction member is transmitted through said loop member and housing and one anchoring surface onto one of said anchor abutments, a pair of opposed anchoring ends on said first named friction element respectively slidably engaged with said anchor abutments wherein the torque of said first named friction element is transmitted through one of said anchoring ends directly onto said one anchor abutment independently of said loop member, and other means connected between said flange means and said loop member permitting axial movement thereof relative to said flange means.

6. A friction device according to claim 1, in which said spaced portions on said actuating member adapted to bear against said loop member comprise opposed groove means in said actuating member, said loop member being received in said groove means to transmit the torque of said second friction element from said loop member to said actuating member and in which said spaced portions on said actuating member positioned to bear against said pair of spaced anchor members comprise opposed anchor surfaces on said actuating member in sliding anchoring engagement with said pair of spaced anchor members.

7. A friction device according to claim 6, comprising an opening in said loop member adjacent to said one disc side having opposed side walls interconnected with a base wall, said opposed side walls being respectively received in said groove means of the actuating member, and abutment means on said actuating member drivingly engaged with said base wall.

8. In a disc brake assembly of the type having an actuating member and a closed loop member in position around a chordal portion of the disc to bring a pair of spaced friction elements into engagement with opposite sides of the disc when actuated by the actuating member, the improvement which comprises:
   a. a pair of spaced anchor members mounted in fixed position adjacent one side of the disc;
   b. said anchor members being separate members from said actuating member and loop member;
   c. said loop member being a separate member from said actuating member which is mounted in the loop member by spaced portions within the loop which bear against opposite sides of said actuating member to provide a first torque transmitting connection between the actuating member and loop member;
   d. said loop member being slidably mounted on said anchor members to move one of said friction elements in against the second side of the disc to establish a frictional engagement upon actuation of said actuating member;
   e. each of said anchor members having a surface thereon which bears against opposite sides of said actuating member in a sliding engagement within the periphery of the disc to provide a second torque transmitting connection between said actuating member and anchor members; and
   f. the torque generated by said frictional engagement which urges the loop member to turn in its own plane being transmitted by said loop member to said actuating member and from said actuating member to said anchor members by the said two pair of torque transmitting connections.

9. The structure specified in claim 8 in which the torque transmitting connections between the loop and actuating member comprise a pair of spaced grooves on opposite sides of the actuating member in which grooves spaced portions of the loop member are positioned to support the weight of the actuating member and provide a fixed engagement between the two members.

10. The structure specified in claim 8 in which the length of the surface of each of said pair of anchor members which bears against opposite sides of said actuating member measured in a direction extending outwardly away from the side of said disc is at least twice the thickness of the loop member measured in a direction parallel to the sides of said disc.

11. A structure as specified in claim 8 in which the anchor members and loop member are formed of stamped sheet metal plates.

12. A structure as specified in claim 11 in which said anchor members comprise a pair of flanges which extend outwardly away from the side of the disc in a plane substantially normal to the side of the disc and in which the flanges are in sliding engagement with said actuating member and loop member.